(12) United States Patent
Kryvokrysenko

(10) Patent No.: US 10,666,503 B1
(45) Date of Patent: May 26, 2020

(54) NETWORK CONNECTION AND TERMINATION SYSTEM

(71) Applicant: Amazon Technologies, Inc., Seattle, WA (US)

(72) Inventor: Artem Kryvokrysenko, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 55 days.

(21) Appl. No.: 16/145,095

(22) Filed: Sep. 27, 2018

(51) Int. Cl.
*H04L 12/24* (2006.01)
*H04L 29/08* (2006.01)
*H04L 29/06* (2006.01)

(52) U.S. Cl.
CPC ...... *H04L 41/0668* (2013.01); *H04L 41/0677* (2013.01); *H04L 67/10* (2013.01); *H04L 67/14* (2013.01); *H04L 67/42* (2013.01)

(58) Field of Classification Search
CPC ..... H04L 41/0668; H04L 67/10; H04L 67/14; H04L 41/0677; H04L 67/42
See application file for complete search history.

(56) References Cited

U.S. PATENT DOCUMENTS

| | | |
|---|---|---|
| 5,572,528 A | 11/1996 | Shuen |
| 6,920,501 B2 | 7/2005 | Chu et al. |
| 7,574,212 B2 | 8/2009 | McConnell et al. |
| 8,166,176 B2 | 4/2012 | Kumar et al. |
| 8,375,436 B2 | 2/2013 | Thornton et al. |
| 8,599,788 B2 | 12/2013 | Song et al. |
| 9,166,862 B1 * | 10/2015 | Davis ............... H04L 29/06047 |
| 9,699,274 B2 | 7/2017 | Hampel |
| 10,057,239 B2 | 8/2018 | Chickering |
| 2003/0120593 A1 * | 6/2003 | Bansal .................. G06Q 20/10 705/39 |
| 2013/0290494 A1 | 10/2013 | Goudarzi et al. |
| 2019/0042323 A1 * | 2/2019 | Shotton ............... H04L 41/5022 |

* cited by examiner

*Primary Examiner* — Walter J Divito
(74) *Attorney, Agent, or Firm* — Robert C. Kowert; Kowert, Hood, Munyon, Rankin & Goetzel, P.C.

(57) ABSTRACT

Various embodiments of a network connection and termination system that provides managed network connection functionality to clients are described. In some embodiments, a network connection and termination system can enable service or application developers to un-bind a live network session from a specific backend server and migrate the live network session to a different backend server, without interrupting the network session and without network client cooperation. This is accomplished by a network connection manager being the actual endpoint for the network connections, instead of any backend resources. The network connection manager can be fault-tolerant. In some embodiments, it contains multiple nodes replicating the state of the network connections so that if one node fails, another can resume the connection in its place.

20 Claims, 10 Drawing Sheets

Data Plane APIs

810

AcceptSocket
Request parameters
- ListenerId

Response parameters
- Socket

820

AcknowledgeSocket
Request parameters
- SocketId

Response parameters
- None

830

ReadFromSocket
Request parameters
- SocketId
- AbsoluteOffset
- Length

Response parameters
- Response is a binary blob which represents data

840

TrimSocketReceiveStream
Request parameters
- SocketId
- AbsoluteOffsetExclusive

Response parameters
- None

850

SendToSocket
Request parameters
- SocketId
- AbsoluteOffset
- Data

Response parameter
- Length

FIG. 8

NETWORK CONNECTION AND TERMINATION SYSTEM

BACKGROUND

With the increased availability of a variety of computing devices that access the internet, many new applications have been developed that leverage internet connectivity and remote provider networks. Computing devices may be stand-alone systems or may be embedded in a variety of products, such as home appliances, manufacturing devices, printers, automobiles, thermostats, smart traffic lights, etc. Many client devices make use of a long-lived connection with a server in order to stream data from the client device to the server and from the server to the client device whenever data needs to be transmitted.

Applications may use various communication protocols, including custom protocols, to implement long-lived connections to multiple client computing devices. For example, a device management application may allow a client to manage thousands of client devices. In many cases, an application provider may need to run a large fleet of servers to listen to the communication protocols and to manage identities and credentials in order to accept connection requests for numerous client devices. Thus, a complicated and costly computer infrastructure may be required in order for an application provider to listen for incoming traffic and to maintain a large number of secure connections for clients.

In some cases, a computing device may communicate with another computing device to provide a stream of data to the other computing device or to send messages back and forth. For example, an audio-visual feed from a security camera may be sent to a remote storage location to store the videos for later use. In order to set up the camera to transmit audio-visual data to a remote storage device, an intermediary infrastructure is required to provide a communication path to transmit the data. For example, software applications may implement various function calls to route data from one device to another device. The process of configuring and modifying the intermediary infrastructure to route data from one device to another device using the appropriate communication protocols can be a burdensome process, particularly for a client that implements a large number of devices. Once a connection is established, the connection needs to be long-lived as it is costly to have the connection disconnected or dropped. With a dropped or disconnected connection, a new connection would have to be established, and data generated by the computing device during the reconnection procedure might be delayed or even lost.

In other cases, applications and infrastructure needs periodic deployments and maintenance. If an application or infrastructure is handling long running TCP sessions, every maintenance event will lead to network sessions being dropped. Application developers partially address these problems by trying to "drain traffic" from the instance, e.g. wait until all network sessions naturally finish while not accepting any new network sessions on the host. This, however, makes maintenance procedures more time consuming and complicated.

In still other cases, load balancing multiple resources can lead to situations where certain resources in a backend fleet are serving more connections than others. If a particular resource is handling long-running TCP connections, this uneven load can accumulate on the resource pushing it to the limit of its capacity and impacting the quality of service of all TCP sessions on that host. In a conventional system, the solution would be to drop a few sessions to reduce the load on the particular resource. However, unfortunately, this means that a customer or client is impacted because of the dropped TCP sessions.

BRIEF DESCRIPTION OF THE DRAWINGS

FIG. 8 is a listing of some predefined data plane API commands of the network connection manager for use by a backend resource, including request parameters and response elements, according to some embodiments.

DETAILED DESCRIPTION

Figure 1:
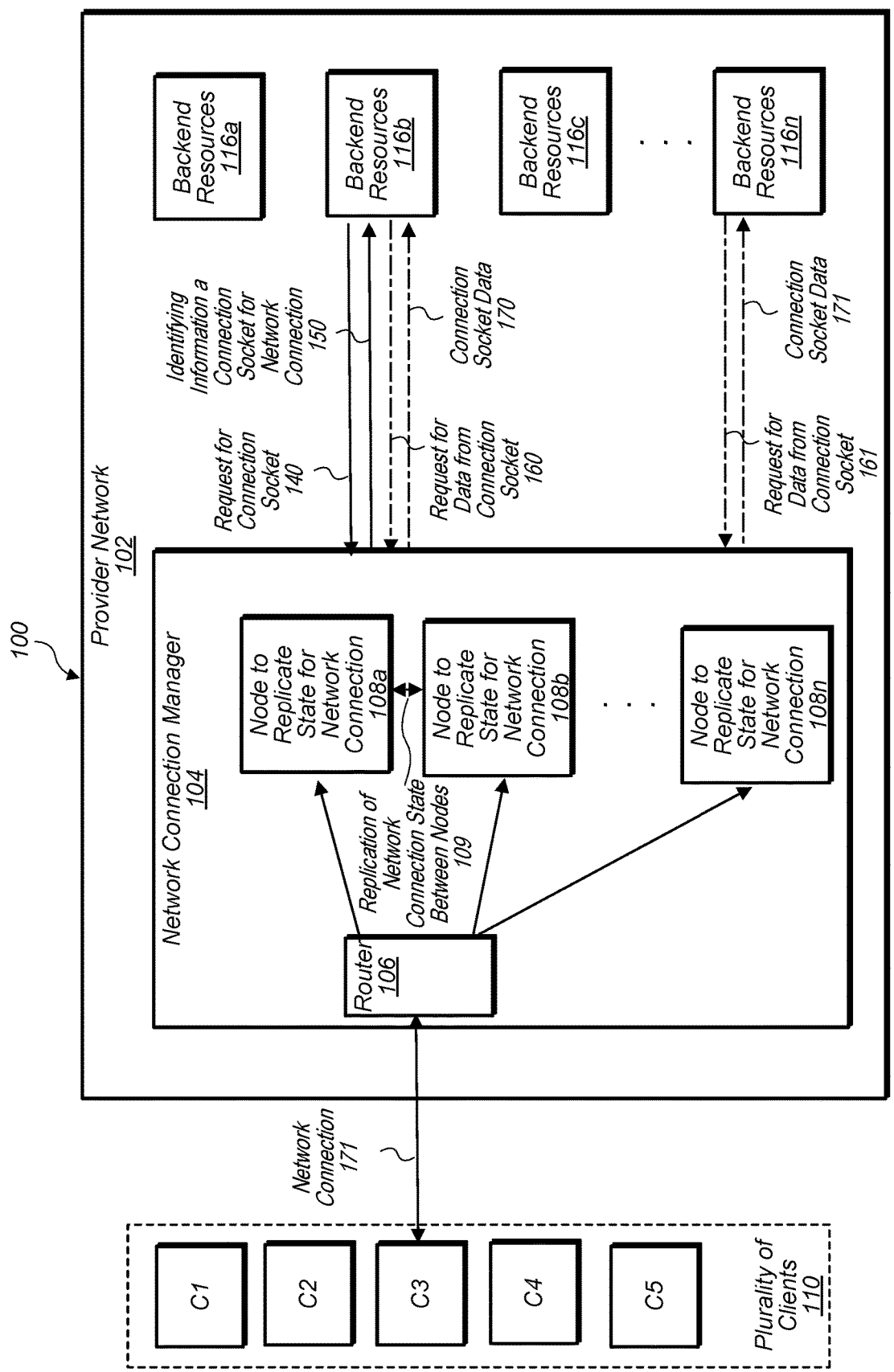
FIG. 1 illustrates a system that comprises a network connection manager, a plurality of clients, and a plurality of backend resources, according to some embodiments.

Various embodiments of a network connection and termination system are described. In some embodiments, a network connection and termination system is a method, apparatus, service, or network appliance that provides managed network connection functionality to clients. A network connection and termination system can enable service or application developers to un-bind a live network session from a specific backend server and migrate the live network session to a different backend server, without interrupting the network session and without network client cooperation, in some embodiments. A network connection and termination system can allow for the migration of live network sessions from one backend host to another without a client's cooperation, in some of these embodiments. A network connection and termination system can allow for fault-tolerant long-running network sessions which don't drop or reset when backend host dies or goes through maintenance. A network connection and termination system effectively turns a network connection into a resource, which can be managed by a network connection and termination infrastructure, such as a network connection manager. A network connection and termination infrastructure, such as a network connection manager, can provide APIs to customers to communicate with this resource. In addition, the network connection and termination infrastructure, such as a network connection manager, can be fault-tolerant, which makes the underlying network connections fault-tolerant and durable.

A network connection and termination system can be used to solve a variety of problems. For example, it can solve the problem of load balancing long-running live network connections. In conventional systems, load balancing multiple resources can lead to situations where certain resources in a backend fleet are serving more connections than others. If a particular resource is handling long-running network connections, this uneven load can accumulate on the resource pushing it to the limit of its capacity and impacting the quality of service of all network sessions on that host. In the conventional system, the solution would be to drop a few sessions to reduce the load on the particular resource. However, unfortunately, this means that a customer or client is impacted because of the dropped network sessions.

Another problem which at least some embodiments of a network connection and termination system addresses is managing capacity while handling long-running network sessions. If a backend fleet of resources is reaching its 100% utilization, for example, a service provider can add more resources to the fleet, but exiting network sessions still will be bounded to old resources, and so old resources might remain at near-100% utilization, while new resources might stay at 10% utilization, for example. If new network sessions are then evenly distributed across all hosts, the backend fleet will remain further unbalanced.

Another example of where at least some embodiments of a network connection and termination system can be implemented is in the case of a service or resource that has a periodic traffic pattern. An example would be if daytime traffic is five times that of nighttime traffic. In this scenario, service will scale up for the peak time. After the peak traffic volume, then traffic will drop leaving resources underutilized, for example, from 100% down to 20%. Ideally the service or resource owner will want to condense traffic on fewer hosts, and shut down idle capacity to reduce costs at night time. But since there is no mechanism to migrate network sessions in conventional systems, the resource owner either has to either keep an underutilized fleet of resources overtime, or shut down part of hosts dropping existing network sessions.

Another problem which at least some embodiments of a network connection and termination system can address is when applications and infrastructure need periodic deployments and maintenance. If an application is handling long running network sessions, for example, maintenance events can lead to network sessions being dropped. In conventional systems, application developers partially address these problems by trying to "drain traffic" from the instance, e.g. wait until all network sessions naturally finish while not accepting any new network sessions on the host. This, however, makes maintenance procedures more time consuming and complicated.

Embodiments of a network connection and termination system addresses these problems. In some embodiments, each network connection is bounded to a node within a network connection manager, and not to the specific backend host. When using this network connection manager in front of backend fleet, for example, an application developer can migrate existing sessions from one backend host to another in any way they want, so addressing the problems described, as well as other issues. As another example, with at least some embodiments of a network connection and termination system, an application developer can migrate existing network sessions from the host to another host, perform a maintenance and then migrate those sessions back, without causing impact to those sessions. As another example, some embodiments will allow a network session to not be dropped or interrupted where an unexpected failure of a backend host has occurred. This network session can be recovered and migrated to a healthy backend host before the network session times out and gets dropped, and the healthy backend host can safely resume network session processing, in at least some embodiments. There are many other problems and issues with computer and networking technology that a network connection and termination system can solve, and the problems or issues described should not be construed as being limiting. The network connection and termination embodiments described here can be applied to many other issues and areas that are not specifically described here.

From the client side, there is a network connection manager that communicates with the client and appears as a normal TCP server to the client, in some embodiments. The client can communicate with the network connection manager using a normal IP address, in some of these embodiments. In these embodiments, a client can connect to the network connection manager over a specific network protocol, such as TCP, and can send data to the appliance and receive data from the appliance. However, the internal design of network connection manager is different from a conventional network appliance where a network connection is established with the client. The network connection manager described in this specification is different because the end of TCP connection might not be bounded to a single network resource, in some embodiments. Instead, with some embodiments, multiple resources can communicate with the client using the same network connection. In some of these embodiments, these multiple resources might all be using the same network address, such as an IP address. Data from a network connection can flow to any one of the multiple resources, and the resources perform their own analysis on the data.

One embodiment of a network connection is a TCP connection. During the TCP initialization, in some embodiments, a network connection manager receives a SYN packet from a client on a specific port that it is listening for connections. If the network connection manager receives a SYN packet on one of the ports it is listening to, the network connection manager might replicate the SYN packet across multiple instances or hosts, in some embodiments. The network appliance then will send a response, such as a SYN-ACK packet, in some embodiments. In response to receiving a SYN-ACK packet, the client will send an ACK packet back to the network connection manager, in some embodiments. This ACK packet might then be replicated by the network connection manager across multiple instances or hosts, in some of these embodiments. Then, after the TCP connection is established, the network connection manager will keep acting like a TCP server, in some embodiments. Therefore, for example, the network connection manager maintains send-receive loops, and other functionality in order to maintain an active TCP connection with the client.

Because the network connection, such as a TCP connection, is not bounded to any single resource, any individual resource can easily be removed from the fleet, or added to the fleet, in some embodiments. Adding or removing resources from the fleet will not impact the state of the network connection itself. This can be accomplished, in some embodiments, by binding the network interface that includes the network connection to multiple instances or hosts. Therefore, the network traffic that flows to a single IP address can be bound to multiple instances or hosts.

Instances or hosts can be added or removed from the fleet of multiple instances or hosts without interrupting the traffic of the network connection itself, in these embodiments.

The network connection manager can be fault-tolerant in some embodiments. Behind the client facing IP-address or port which is used to establish the network connection, in these embodiments, there can be multiple nodes that are replicating the state of the network connections. The state of a network connection can be replicated between or across two or more of these nodes in these embodiments.

There are various methodologies that can be employed to replicate the state of a network connection between or across multiple nodes of a network connection manager. This can be accomplished, in some embodiments, by using a network interface that can be hosted by a group of computer systems, such that network packets that are received by the network interface can be sent to one or many computer systems. Therefore, the appropriate nodes that are replicating the state of the network connection can receive packets from the client, and can therefore keep their network connection state machines up to date. In other embodiments, there can be two layers of nodes. The first layer of nodes would select the nodes in the second layer that will replicate the state of the network connection, and then will pass packets from the client to the nodes in the second layer. The nodes in the first layer can, in some embodiments, be safely be replaced in the first layer without adverse implications. In these embodiments, a new node at the first level can rediscover the nodes in the second layer that are replicating the state of the network connection, and will send packets from the client to those nodes in the second layer. In still other embodiments, a flat layer of nodes is used so that whatever node receives the packets from the client will self-select themselves to be the primary node. In some embodiments, this primary node can be referred to as the leader. The primary node will discover which node was the primary node for the network connection previously, and retrieve the current state of the network connection. Therefore, in these embodiments, even though traffic from the network connection has shifted to the new node, because for example the initial node may have failed, the new node can discover what nodes have the state of the network connection replicated and request the current state of the network connection from those nodes.

For example, in the case of a TCP handshake of a TCP connection, when the SYN packet is received by the network connection manager, the packet can be replicated across all of the nodes. One of the multiple nodes can be designated or assigned or assume the responsibility to send a SYN-ACK response packet back to the client. There are many different methods to determine which node of the multiple nodes is the node that responds to the client. This node can be referred to as the leader node, in some embodiments. This leader node might inform the other nodes that a response has been sent to the client, in some embodiments. All TCP activity is handled in a similar manner, in these embodiments, with the state of the TCP connection being replicated between or across the multiple nodes of the network connection manager.

In order to determine which node or nodes, of the multiple nodes of the network connection manager, responds to the client, there can be many different methods employed. In some embodiments, there can be shared responsibilities such that some nodes listen to the network connection and receive packets and data, while other nodes respond using the network connection, sending packets and data. For example, when a network packet is received, it is saved on a particular node and then sent to another node. This other node might save the packet as well, and then this other node will send the response. In these embodiments, some nodes might just receive traffic from the network connection, and some nodes might just send traffic to the network connection, while all the nodes share the same network connection state. In some other embodiments, one of the hosts might be elected or assume the duties of sending data or packets to the network connection, while the other nodes track the state, along with possibly the packets received and sent through the network connection. If the node that is sending the data or packets to the network connection goes down for some reason, or relinquishes its duties, for example, then another node might assume the duties of, or be assigned, or elected as the new node to communicate to the client through the TCP connection, in some embodiments. This node can be referred to as the new leader node, in some embodiments.

In some embodiments, the state of the network connection might be sent to cold storage. This can occur when, for example, a network connection might require the network connection manager to keep too much state for the connection. These embodiments can be useful, for example, where a network connection lasts for weeks, but the client only send a very small amount of data, such as, for example, 10 bytes a day. The client might be a low power device that attempts to establish one network connection, and then use that network connection for as long as it can, in some embodiments. This network connection, however, can require a high cost in the network connection manager because a kernel object might need to be maintained and memory needs to be dedicated for the network connection, in some embodiments. At least some of the data in memory relating to the network connection can be sent to cold storage and does not have to be maintained full-time by the network connection manager. The network connection manager can retrieve this data from cold storage when it is needed, for example, when the client has sent a new packet or new data through the network connection.

In order for the backend resources to communicate with the network connection manager, the backend resources can establish a tunnel to the network connection manager, in some embodiments. The tunnel might be, for example, an HTTPS or SSL or TLS tunnel. After establishing a tunnel, a backend resource can perform remote procedure call ("RPC") calls to the network connection manager. These operations can be the same operations that a normal operating system socket will provide, in some embodiments. A backend resource, for example, can accept a new socket, close a socket, send data to the socket, and receive data from the socket.

The flow of the operations, in some embodiments, begins when a network connection manager establishes a network connection, such as a TCP connection, with a client. As soon as the network connection is established, the network connection manager creates an internal object called a socket which represents the network connection, in some embodiments. After a socket is created, a backend resource can then perform an RPC over the established tunnel using an operation, such as "AcceptSocket", that is part of the predefined API of the network connection manager, in some embodiments. In response to an "AcceptSocket" operation, the network connection manager will return one of the sockets to the backend resource. The socket contains a socket-id, the IP address of the client, the IP address used by the network connection manager for the other endpoint of the connection, as well as the ports used by the network connection, in some embodiments. Using this API, the backend resources can discover new network connections and receive a socket object from the network connection manager.

The network connection manager can perform load balancing on the backend resources that are ready to accept a socket, in some embodiments. If, for example, more than one backend resource has performed an "AcceptSocket" operation indicating that they are ready to accept a new socket, but no new socket is available, then the network connection manager will not respond to those "AcceptSocket" operations until a new network connection is established with the client, and a new socket becomes available. At this point, the network connection manager can decide which of the pending "AcceptSocket" operations from which of the backend resources it will respond to. The network connection manager can perform load balancing in deciding which of the pending "AcceptSocket" operations from which of the backend resources it will respond to. The network connection manager might use statistics or metrics from the backend resources to make this decision, in some embodiments.

The backend resources can also perform load balancing. For example, in some embodiments, there might be a limited number of backend resources that request sockets from the network connection manager, using, for example, the "AcceptSocket" operation. These limited number of backend resources can perform a load balancing operation, in some embodiments. These limited number of backend resources can determine which of the other backend resources to send or "farm out" the socket to, and thereby give to that backend resource the work that comes with processing the data from the socket. These other backend resources would assume control of the socket and communicate directly with the network connection manger in reading and writing data to the socket. These limited number of backend resources might use statistics or metrics from the other backend resources to make this decision, in some embodiments. In other embodiments, a backend resource might not request new sockets using, for example, the "AcceptSocket" operation, if its load too high, for example above a certain threshold.

In some embodiments, after the network connection is established, a backend resource performs an "AcceptSocket" operation, and the network connection manager responds with a socket ID of the network connection to the backend resource. As an example, in one embodiment, a video camera can be connected to the network connection manager over a TCP connection. In this embodiment, the network connection manager responds to an "AcceptSocket" operation with a socket ID of the network connection with the video camera. After receiving the socket ID, the backend resource can then start performing other operations. The backend resource can, for example, start reading data from the socket by performing a "ReadFromSocket" operation, for example. The backend resource provides the socket ID and a data offset to the network connection manager as part of the operation. The network connection manager, in response to this "ReadFromSocket" operation, provides data from the socket to the backend resource, in some embodiments. Therefore, whatever data a client sends over the TCP connection to the network connection manager, the backend resources can read from the socket in these embodiments.

The backend resource can also send data to the client. In some embodiments, the backend resource performs a "SendToSocket" operation to send data to the client through the tunnel established to the network connection manager. The backend resource can provide a socket ID and data that it wants to send when performing the operation, in some embodiments. The network connection manager receives the data from the backend resource through the established tunnel, and then sends this data to correct client through the network connection associated with the socket ID.

The API provided by the network connection manger can be idempotent, in some embodiments, such that if a backend resource dies or becomes disconnected or stops responding, another backend resource can take over the socket from the network connection manager with no data or work being lost. For example, when a backend resource performs the "AcceptSocket" operation, in some embodiments, the backend resource receives a socket ID. After providing the socket ID to the backend resource, the network connection manager then waits for an expects an "AcknowledgeSocket" operation from the backend resource. However, if the backend resource then dies immediately, however, the network connection manager will never receive the "AcknowledgeSocket" operation from the backend resource. The network connection manager waits for a predetermined amount of time for backend resource to perform the the "AcknowledgeSocket" operation, and after this time the network connection manager will release the socket to eventually be reissued to another backend resource, in some embodiments. In this way, the system guarantees that each socket is going to be received and acknowledged by an active backend resource at least once.

Another example of the API provided by the network connection manger being idempotent is shown when reading data from a socket or sending data to a socket. A backend resource can perform a "ReadFromSocket" operation to read data from a socket, for example. However, the backend resource might die or become disconnected after the network connection manager has sent data from the socket to the backend resource. If this occurs, then the API provided by the network connection manger allows for another backend resource to read the same data from the socket, in some embodiments. This functionality is provided because a backend resource that performs a "ReadFromSocket" operation provides a socket ID and a data offset to the network connection manager as part of the operation. This data offset is an offset from the beginning of a network connection, in some embodiments. If a backend resource crashes, then another backend resource can read the same data by simply providing the same data offset when performing a "ReadFromSocket" operation from the same socket. Likewise, if a backend host is attempting to send data to a client, but dies before the send operation is completed, another backend host can perform the same "SendToSocket" operation using the same data offset to guarantee that the data is sent. The network connection manager will ensure that data from the duplicated calls is sent in the proper sequence over the network connection to the client only once.

In some embodiments, when a backend resource is finished processing data that it has received from a socket, the network connection manger provides an operation as part of its API that allows the backend application to delete that data from the stream of data associated with the socket. For example, the network connection manger can provide a "TrimSocketReceiveStream" operation, in some embodiments. This operation allows a backend resource to delete data that it has already processed from a receive stream associated with the socket. In some embodiments, the backend resource provides an offset that represents the first byte of the receive stream of the socket that it wants to be non-discarded, such that all other bytes of data before the offset will be discarded. This operation of the network connection manager API frees internal buffers for new data to be received from client.

In some embodiments, backend resources can share information regarding the state of the session or the state of processing of the data from a socket, such that if a backend application dies or is terminated, another backend can take over the processing of data from a socket and the communicating with a client associated with a socket. A backend resource, in these embodiments, has some mechanism of checkpointing or sharing the application state amongst the various backend resources. In some embodiments, the backend resources can perform checkpoints when some processing regarding the data from the socket is completed. During this checkpoint, the backend resource can share the session state or some other state regarding the processing of the data from the socket with one or more other backend resources. This can be accomplished in various ways. In some embodiments the backend resource can utilize some kind of peer-to-peer communication mechanism among the backend resources to communicate the appropriate state. In other embodiments, the backend resources can utilize a database, where the database might be fault tolerant and might be able to be accessed by any of the backend resources.

If the original backend resource dies or becomes disconnected, a new backend resource can examine the state of the original backend host and determine what operations had been completed, and what operations were still in process by the original backend resource. The new backend resource can use the same socket ID that the previous backend resource was using to communicate with the network connection manager regarding the socket. When the new backend resource succeeds in performing operations associated with the socket, then the new backend resource can perform its own checkpoint regarding the socket and share the session state or some other state regarding the processing of the data from the socket with one or more other backend resources.

Embodiments of a Network Connection and Termination System

FIG. 1 illustrates a system that comprises a network connection manager, a plurality of clients, and a plurality of backend resources, according to some embodiments. Embodiments of a network connection and termination system are described that may be implemented on or by a provider network, in some embodiments, that communicates with a plurality of clients. In other embodiments a network connection and termination system may be implemented in enterprise networks or simple client-server networks, or any kind of network where a computer accesses a resource through a network.

The service provider network 102 may provide computing resources via one or more computing services to the client(s) 110. The service provider network 102 may be operated by an entity to provide one or more services, such as various types of cloud-based computing or storage services, accessible via the Internet and/or other networks to client(s) 110. In some embodiments, the service provider network 102 may implement a web server, for example hosting an e-commerce website. Service provider network 102 may include numerous data centers hosting various resource pools, such as collections of physical and/or virtualized computer servers, storage devices, networking equipment and the like, needed to implement and distribute the infrastructure and services offered by the service provider network 102. In some embodiments, service provider network 102 may employ computing resources for its provided services. These computing resources may in some embodiments be offered to client(s) 110 in units called "instances," such as virtual compute instances.

The client(s) 110 may encompass any type of client configurable to submit requests to the service provider network 102. For example, a given client 110 may include a suitable version of a web browser or may include a plug-in module or other type of code module configured to execute as an extension to or within an execution environment provided by a web browser. Alternatively, a client 110 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 110 may be configured to generate network-based services requests according to a Representational State Transfer (REST)-style network-based services architecture, a document- or message-based network-based services architecture, or another suitable network-based services architecture. In some embodiments, the service provider network 102 may offer its services as web services, and the client(s) 110 may invoke the web services via published interfaces for the web services. In some embodiments, a client 110 (e.g., a computational client) may be configured to provide access to a computing service 102 in a manner that is transparent to applications implemented on the client(s) 110 utilizing computational resources provided by the service provider network 102.

The client(s) 110 may convey network-based services requests to the service provider network 102 via network connection 171. In various embodiments, network connection 171 may encompass any suitable combination of networking hardware and protocols necessary to establish network-based communications between clients 110 and service provider network 102. For example, a network connection 171 may generally encompass the various telecommunications networks and service providers that collectively implement the Internet. A network connection 171 may also include private networks such as local area networks (LANs) or wide area networks (WANs) as well as public or private wireless networks. For example, both a client 110 and the service provider network 102 may be respectively provisioned within enterprises having their own internal networks. In such embodiments, the network connection 171 may include the hardware (e.g., modems, routers, switches, load balancers, proxy servers, etc.) and software (e.g., protocol stacks, accounting software, firewall/security software, etc.) necessary to establish a networking link between the client 110 and the Internet as well as between the Internet and service provider network 102. In some embodiments, client(s) 110 may communicate with service provider network 102 using a private network rather than the public Internet.

The provider network 102 in FIG. 1 includes a network connection manager 104 and a plurality of backend resources 116a . . . 116n. The network connection manager 104 can be network appliance which performs a network connection termination function in order to provide an endpoint for the network connection 171, in some embodiments. There is only one network connection 171 shown from client C3 to the network connection manager 104. The network connection manager 104 includes a router 106 that routes packets to a plurality of nodes 108a . . . 108n that replicate the state for the network connection. There can be other nodes (not shown) as part of the network connection manager that do not replicate the state of the network connection, but may be used, for example, to replicate the state of other network connections.

The system can also include network interfaces, tunnel network interfaces, and stream sockets. A network interface can be a device which sends packets to the network and receive packets from the network, in some embodiments. Network interfaces can be attached to the network connection manager 104. If a network interface is attached to the network connection manager 104, then the network connection manager 104 will be receiving and processing all network packets which are sent to the network interface. Network interface can have IP addresses associated with it. A tunnel network interface ("TNI") can be a type of network interface which is attached to the network connection manager 104 and used to establish tunnel between a backend resource 116a . . . 116n and the network connection manager 104, and be used to invoke APIs on the network connection manager 104 using RPC, in some embodiments. Network connection manager 104 might have one tunnel network interface which cannot be re-attached or changed. A stream socket can be a representation of the network connection 171 endpoint, in some embodiments. It can have associated information about the remote endpoint on the client C3, as well as the corresponding network connection state.

From the client side, the network connection manager 104 communicates with the client and appears as a normal network connection server to the client, in the embodiments shown in FIG. 1. The clients 110 can communicate with the network connection manager 104 using a normal IP address, in some of these embodiments. In these embodiments, a client such as C3 of the plurality of clients 110 can connect to the network connection manager 104 over a specific network protocol, such as TCP, and can send data to the network connection manager 104 and receive data from the network connection manger 104. However, the internal design of network connection manager 104 is different from a conventional network appliance where a network connection is established with the client. The network connection manager in the embodiments shown in FIG. 1 is different because the end of TCP connection is not be bounded to a single backend resource. Instead, in the embodiments shown in FIG. 1, multiple backend resources 116a . . . 116n can communicate with the client using the same network connection 171. In some of these embodiments, these multiple backend resources 116a . . . 116n might all be using the same network address, such as an IP address. Data from a network connection can flow to any one of the multiple backend resources 116a . . . 116n, and the resources perform their own analysis on the data.

Because the network connection 171 is not bounded to any single backend resource 116a . . . 116n, any individual backend resource can easily be removed from the fleet, or added to the fleet, in some embodiments. Adding or removing backend resources 116a . . . 116n from the fleet will not impact the state of the network connection 171 itself. The application state of the backend resources can be shared with other backend resources or with a database that stores the state of the backend resources. There are a number of different mechanisms by which a backend resource by save or replicate its state. When a backend resource is removed from the fleet or is disconnected for any reason, then the saved state of that backend resource can be used by another backend resource to maintain the network connection 171.

The network connection manager 104 can be fault-tolerant in some embodiments. Behind the client facing IP-address or port which is used to establish the network connection 171, in these embodiments, there can be multiple nodes 108a . . . 108n that are replicating the state of the network connection 171. The nodes 108a . . . 108n have a protocol or communication mechanism 109 among the nodes that replicates the network connection state between the nodes. Communication mechanism or protocol 109 replicates the network connection state between node 108a and 108b, for example. The state of a network connection can be replicated between or across two or more of these nodes in these embodiments.

There are various methodologies that can be employed to replicate the state of a network connection between or across multiple nodes of a network connection manager. This can be accomplished by using a network interface that can be hosted by a group of computer systems, such that network packets that are received by the network interface can be sent to one or many computer systems. Therefore, the appropriate nodes that are replicating the state of the network connection can receive packets from the client, and can therefore keep their network connection state machines up to date. In the embodiments shown in FIG. 1, all the appropriate nodes 108a . . . 108n that are replicating the state of the network connection 171 are receiving packets from the client C3, and can therefore keep their network connection state machines up to date. In other embodiments, not shown in FIG. 1 there can be two layers of nodes. The first layer of nodes would select the nodes in the second layer that will replicate the state of the network connection, and then will pass packets from the client to the nodes in the second layer. The nodes in the first layer can, in some embodiments, be safely be replaced in the first layer without adverse implications. In these embodiments, a new node at the first level can rediscover the nodes in the second layer that are replicating the state of the network connection, and will send packets from the client to those nodes in the second layer. In still other embodiments, there is not two layer of nodes, but instead a flat layer of nodes. In some of these embodiments, whatever nodes receives the packets from the client will self-select themselves to be the primary node. In some embodiments, this primary node can be referred to as the leader. The primary node will discover which node was the primary node for the network connection previously, and retrieve the current state of the network connection. Therefore, in these embodiments, even though traffic from the network connection has shifted to the new node, because for example the initial node may have failed, the new node can discover what nodes have the state of the network connection replicated and request the current state of the network connection from those nodes.

For example, in the case of a TCP handshake of a TCP connection, when the SYN packet is received by the network connection manager 104, the packet can be replicated across all of the nodes 108a . . . 108n. One of the multiple nodes can be designated or assigned or assume the responsibility to send a SYN-ACK response packet back to the client. There are many different methods to determine which node of the multiple nodes is the node that responds to the client. This node can be referred to as the leader node, in some embodiments. This leader node might inform the other nodes that a response has been sent to the client, in some embodiments. All TCP activity is handled in a similar manner, in these embodiments, with the state of the TCP connection being replicated between or across the multiple nodes of the network connection manager.

In order to determine which node or nodes, of the multiple nodes 108a . . . 108n of the network connection manager 104, responds to the client C3, there can be many different methods employed. In some embodiments, there can be shared responsibilities such that some nodes listen to the network connection and receive packets and data, while other nodes respond using the network connection, sending packets and data. For example, when a network packet is received, it is saved on a particular node and then sent to another node. This other node might save the packet as well, and then this other node will send the response. In these embodiments, some nodes might just receive traffic from the network connection, and some nodes might just send traffic to the network connection, while all the nodes share the same network connection state. In some other embodiments, one of the hosts might be elected or assume the duties of sending data or packets to the network connection, while the other nodes track the state, along with possibly the packets received and sent through the network connection. If the node that is sending the data or packets to the network connection goes down for some reason, or relinquishes its duties, for example, then another node might assume the duties of, or be assigned, or elected as the new node to communicate to the client through the TCP connection, in some embodiments. This node can be referred to as the new leader node, in some embodiments.

In FIG. 1, the backend resource 116b has performed an operation to request a connection socket 140 to the network connection manager 104. The backend resource 116b can, for example, perform an RPC over an established tunnel using the operation, such as "AcceptSocket", that is part of the predefined API of the network connection manager 104, in some embodiments. In response to the request 140, the network connection manager 104 will return information identifying a connection socket 150 to the backend resource 116b. The socket can also contain information such as a socket-id, the IP address of the client, the IP address used by the network connection manager for the other endpoint of the connection, as well as the ports used by the network connection, in some embodiments.

The backend resource 116b can start reading data from the socket by requesting data from the connection socket 160, in the embodiments shown in FIG. 1. As one example, the backend resource 116b can perform a "ReadFromSocket" operation. The backend resource 116b can provide the socket ID and a data offset to the network connection manager 104 as part of the operation. The network connection manager 104, in response to this request, provides data from the connection socket to the backend resource 170. Therefore, whatever data a client C3 sends over network connection 171 to the network connection managera 104, the backend resource 116b can read from the socket in the embodiments shown in FIG. 1

FIG. 1 also discloses that the backend resource 116n can also start reading data from the socket by requesting data from the connection socket 161. The backend resource 116n can request the same or different data that was read from backend resource 116b. The network connection manager 104, in response to this request, provides data from the connection socket to this backend resource 171. The backend resource 116n somehow obtained the socket identification of the socket associated with network connection 171 in order to request data from the connection socket 161. Backend resource 116n might have been sent this information from another backend resource, for example, or might have been given the information by an application developer or by IT professional through system call managing the backend resources, as another example.

Figure 2:
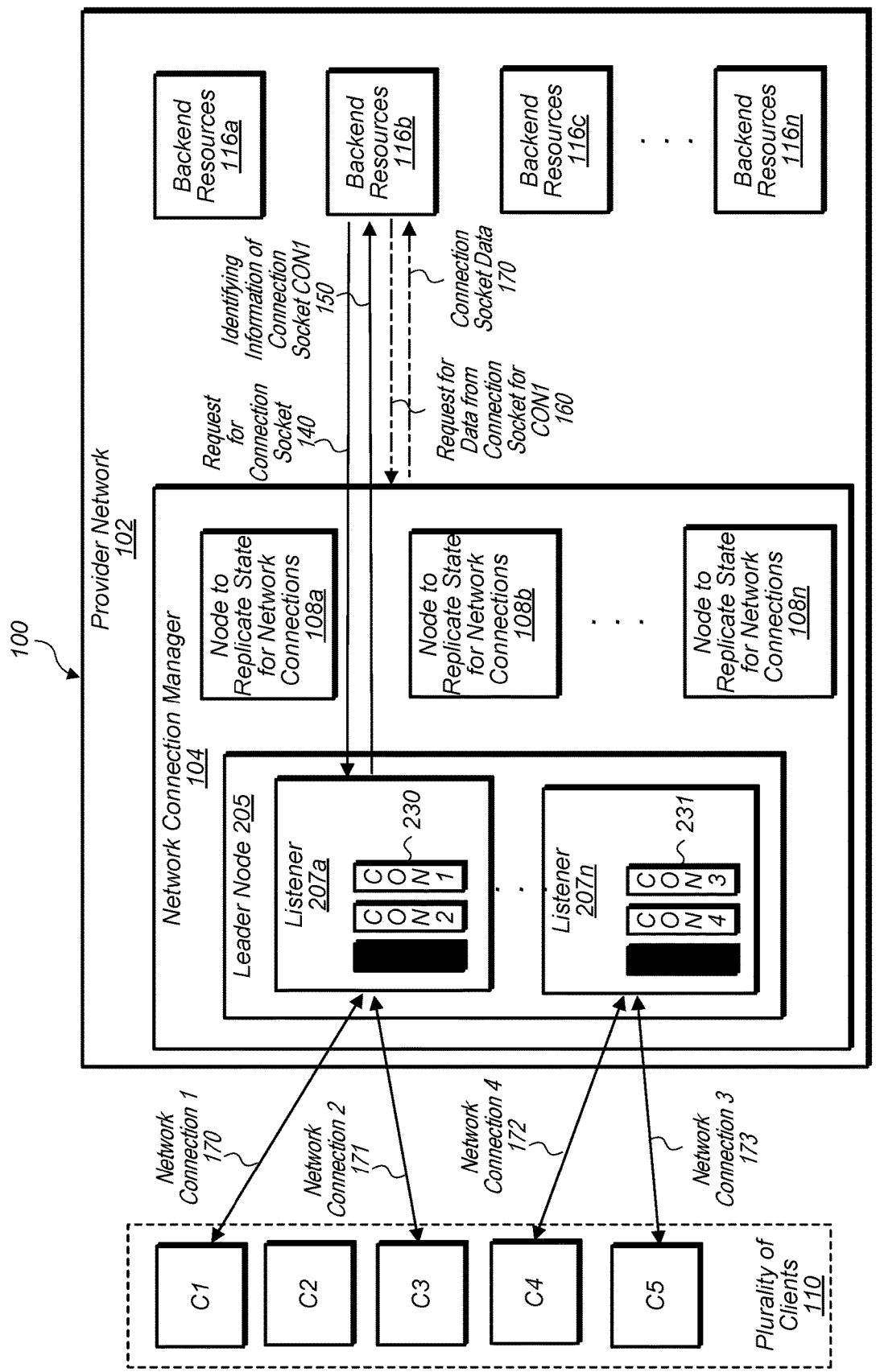
FIG. 2 illustrates an embodiment of network connection manager comprising a leader node with multiple listeners.

FIG. 2 illustrates an embodiment of network connection manager 104 comprising a leader node 205 with multiple listeners 207a . . . 207n. Listeners 207a . . . 207n can be routines that run inside the network connection manager 104 and constantly check for connection requests. A listener 207a . . . 207n can be configured to work with specific protocols and ports in some embodiments. For example, a listener 207a . . . 207n can accept traffic only on specific ports, while other listeners accept traffic on other ports.

In FIG. 2 shows that listener 207a is handling network connection 1 170 with client C1 and network connection 2 171 with client C3. FIG. 2 further shows that listener 207n is handling network connection 4 172 with client C4 and network connection 3 173 with client C5. Each listener contains an accept queue. Listener 207a contains accept queue 230 which has two entries containing sockets that are associated network connection 1 170 and network connection 2 171. Listener 207n contains request queue 231 which also has two entries containing sockets that are associated with network connection 3 173 and network connection 4 172. In request queue 230 the socket associated with network connection 1 is at the top of the queue. In request queue 231, the socket associated with network connection 3 is at the top of the queue. FIG. 2 also discloses a plurality of nodes to replicate the state for network connections 108a . . . 108n. The network connection manager 104 can use any of the embodiment described previously to replicate the state of network connections to these nodes. Not all the nodes 108a . . . 108n replicate the state of all the network connections 170-173. Some nodes might replicate the state of some network connections while other nodes might replicate the state of other network connections.

FIG. 2 demonstrates that the backend resource 116b has performed an operation to request a connection socket 140 to the listener 207a of the leader node 205 of the network connection manager 104. The backend resource 116b can, for example, perform an RPC over an established tunnel using the operation, such as "AcceptSocket", that is part of the predefined API of the network connection manager 104, in some embodiments. The operation to request a connection socket 140, in some embodiments, requires an input parameter that is the listener identification of the listener 207a that the backend resource 116b is requesting a socket from. In response to the request 140, the listener 207a will return information identifying a connection socket 150 for the socket CON1, that is associated with network connection 1 170, to the backend resource 116b. Since socket CON1 is at the top of request queue 230, the listener 207a returns identifying information of this socket to backend resource 116b.

To configure the system shown in FIG. 2, in some embodiments, a customer has to configure the various components first, this will prepare infrastructure to receive and accept network connections. This workflow usually done once, and then created components are used for as long as service is running. The commands to configure the system can include: "CreateGadget" which creates the network connection manager 104, "Create Listener on the Gadget" which can be used to create listeners 207a through 207n, "Create Network Interface" which is used to create a network interface for the network connection manager 104, and "Attach Network Interface to the Gadget" which can be used to attach a network interface to the network connection manager 104.

A customer can repeat "Create Network Interface" and "Attach Network Interface to the Gadget" multiple times if they want to have many data network interfaces on their network connection manager 104. If a customer has established trust relations with customers or partners in other accounts, they can cross-attach network interfaces from one account to the network connection manager in another account. After this configuration workflow is finished, the network connection manager 104 will start accepting new network connections. For example, when the network connections are TCP connections, the network connection manager 104 will be performing a TCP handshake and running the rest of TCP state machine for the connection.

Figure 3:
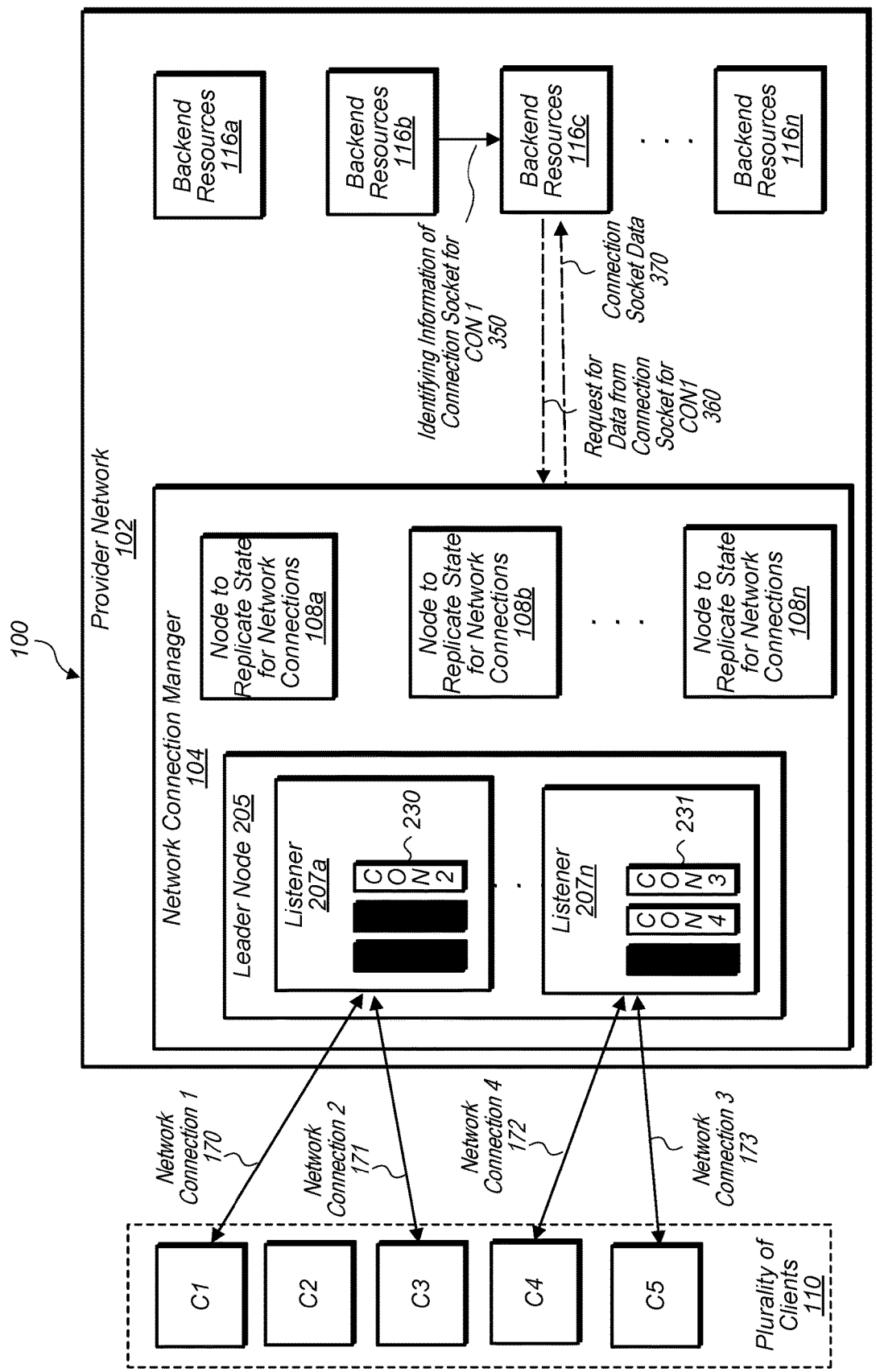
FIG. 3 illustrates an embodiment of network connection manager comprising a second backend resource requesting data from the connection socket for network connection 1.

FIG. 3 illustrates an embodiment of network connection manager comprising a second backend resource requesting data from the connection socket for network connection 1. In the embodiment shown in FIG. 3, backend resource 116*b* sends identifying information for connection socket for network connection 1 350 to backend resource 116*c*. This can occur through a peer-to-peer communication, for example. Now that the backend resource 116*c* has the identifying information for connection socket for network connection 1 350, it can request data from the connection socket 360. In response to the request for data, the network connection manager 104 sends connection socket data 370 to the backend resource 116*c*.

Flow Diagrams for Various Embodiments of a Network Connection Manager

Figure 4:
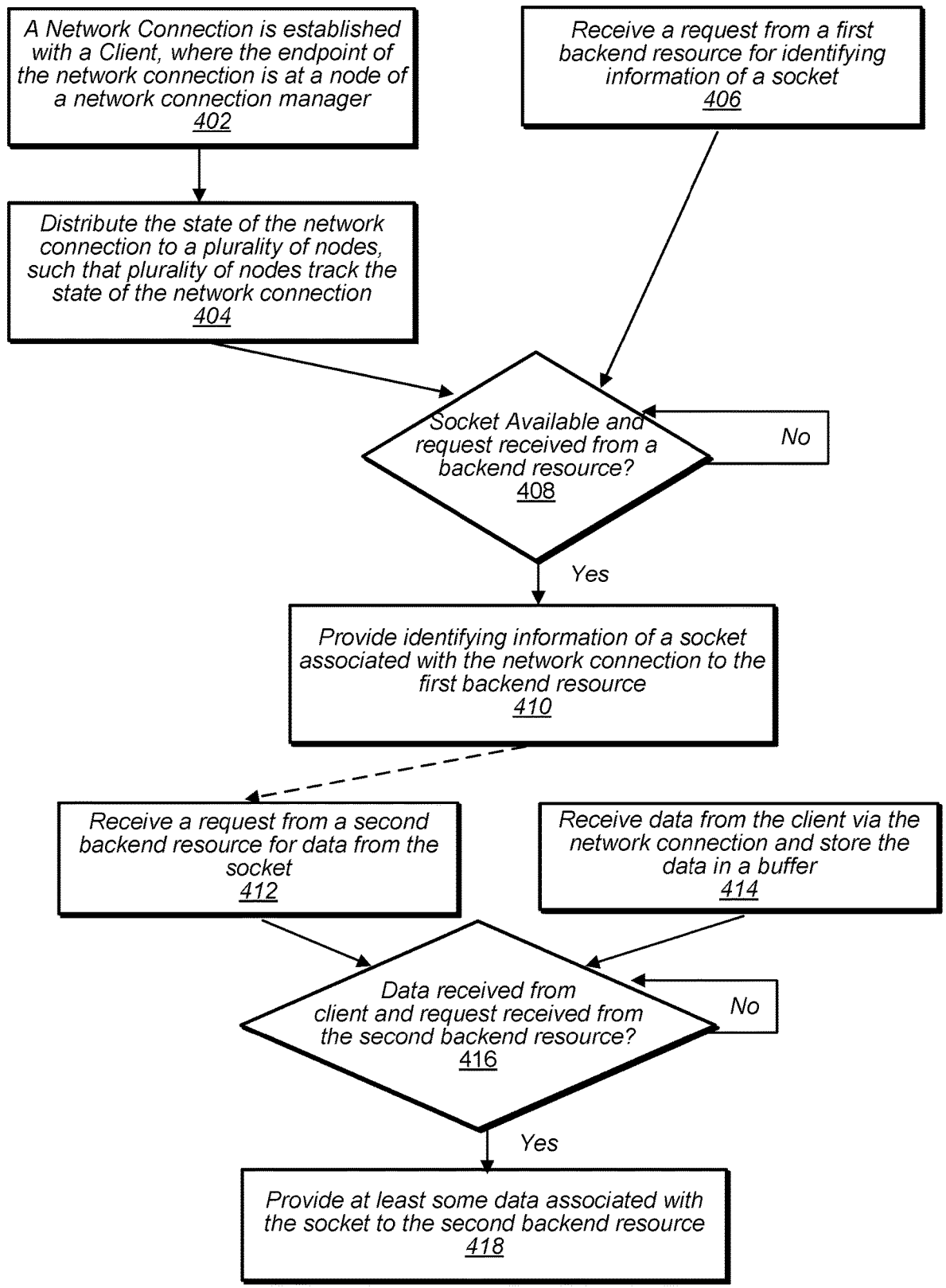
FIG. 4 illustrates is a flowchart of an illustrative method that can be performed by a network connection manager, according to at least some embodiments.
Figure 5:
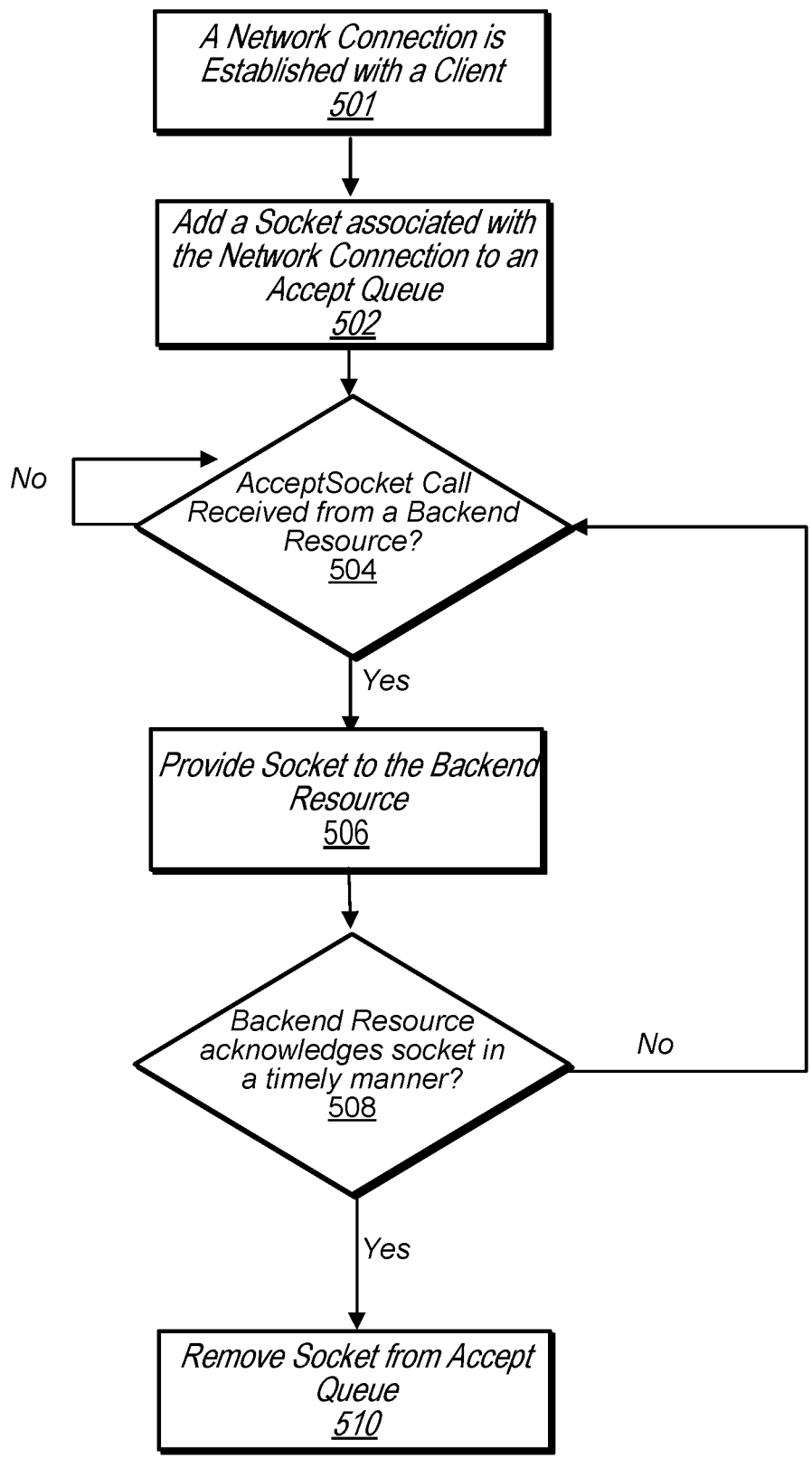
FIG. 5 illustrates is a flowchart of an illustrative method of adding sockets to a queue and proving sockets to backend resources, according to at least some embodiments.

FIGS. 4-5 are flow diagrams that illustrate various scenarios according to at least some embodiments. FIG. 4 illustrates is a flow diagram of an illustrative method that can be performed by a network connection manager, according to at least some embodiments. The flow diagram starts in block 402 where a network connection is established with a client, where the endpoint of the network connection is at a node of a network connection manager. The flow diagram transitions to block 404 that distributes the state of the network connection to a plurality of nodes, such that plurality of nodes track the state of the network connection.

The flow diagram transitions to block 408 that waits for a socket to be available, where the socket is associated with a network connection, and also waits for a request to be received from a backend resource. Meanwhile, the flow diagram shows that at some point either before or after blocks 402 and 404 are performed, block 406 receives a request from a first backend resource for identifying information of a socket. In block 408, when a socket associated with a network connection is available and a request has been received from a backend resource for identifying information of a socket, then block 408 transitions to block 410. Block 410 provides identifying information of a socket associated with the network connection to the first backend resource.

The flow diagram then transitions to block 412 which receives a request from a second backend resource for data from the socket. Meanwhile, block 414 receives data from the client via the network connection and stores the data received in a buffer. Blocks 412 and 414 transition to block 416 which checks if data has been received from the client, and whether a request has been received from a second backend resource for data from the socket. If both of these conditions have occurred, then the flow diagram transitions to block 418 that provides at least some data associated with the socket to the second backend resource.

FIG. 5 illustrates is a flowchart of an illustrative method of adding sockets to a queue and proving sockets to backend resources, according to at least some embodiments. Backend resources can discover sockets regarding new network connections which have arrived on the network connection manager 104. For every new TCP connection which is established with the network connection manager 104, the network connection manager 104 will create a Socket object with its unique ID, in some embodiments. All new sockets can be placed into an accept queue and are available for discovery by backend applications, in some of these embodiments.

The network connection manager 104 provides 2 APIs for discovering new sockets: "AcceptSocket" which returns to the caller a new socket from the accept queue associated with a particular listener; and "AcknowledgeSocket" which marks a socket as acknowledged by a backend resource, which removes it from the accept queue. Pseudo-code for a socket accept loop looks like:

```
/* Identifiers which we get during configuration workflow */
gadgetAddress="https://abcdsafa.elasticsocket.
website.com/"
listenerId="listener-12345";
var gadget=new ElasticSocket.Gadget(gadgetAddress);
/* Running this loop forever so we can discover new
connections while they arrive */ while (true) {
/* Accept socket from the queue */
var socket=gadget.acceptSocket(listenerId);
/* Call internal application method which starts processing
of the socket */ startProcessingSocket(socket);
/* Remove socket from the gadget's accept queue */
gadget.acknowledgeSocket(socket.socketId);
}
```

If a backend resource calls "AcceptSocket" but fails to call "AcknowledgeSocket" (for example, due to internal failure), then, after a configurable timeout the network connection manager will automatically return socket to the visible state in the accept queue and it can be re-discovered by another healthy backend resource. This behavior guarantees that each socket will be reliably accepted by a backend resource at least once.

FIG. 5 is a flow diagram that shows state transitions of an accept queue in a listener while a socket is in the accept queue. The flow diagram starts in block 501 where a network connection is established with client. Then the flow diagram transitions to block 502 that adds a socket associated with the network connection to an accept queue. Then the flow diagram transitions to block 504 that checks whether an "AcceptSocket" call has been received from a backend resource. If an "AcceptSocket" call has been received, then the flow diagram transitions to block 506 that provides a socket to the backend resource. The flow diagram transitions to block 508 that checks if the backend resource acknowledged the socket in a timely manner, such as through an "AcknowledgeSocket" call. If the backend resource did not acknowledge the socket, the flow diagram transitions back to block 504. If the backend resource did acknowledge the socket, then the flow diagram transitions to block 510 where the socket is removed from the accept queue.

Data Receive Workflow and Data Send Workflow

Figure 6:
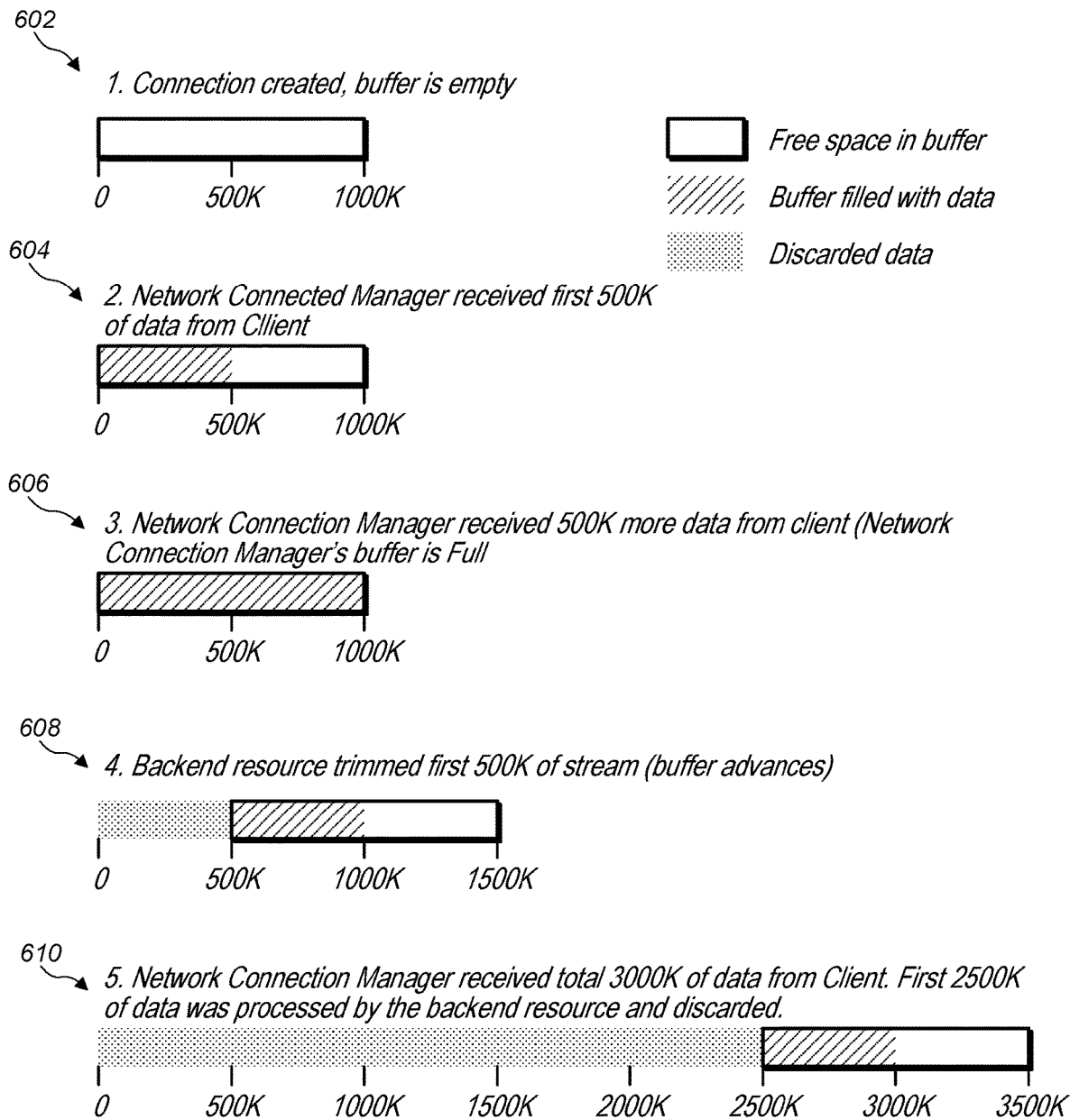
FIG. 6 is a diagram that illustrates a data buffer of a network connection manager, as a result receiving data from a client over the network connection, according to at least some embodiments.

FIG. 6 is a diagram that illustrates a data buffer of a network connection manager, as a result receiving data from a client over the network connection, according to at least some embodiments. After a network connection is established between a client and a network connection manager, the client can send data to the network connection manager over the network protocol, such as TCP. The network connection manager will run a receive loop and, put this data into an internal fault-tolerant buffer assigned to the socket, in some embodiments. For example, element 602 of FIG. 6 shows that a connection is created and that the buffer is empty. Element 604 demonstrates that the client has sent the first 500K bytes of data. The network connection manager can send an acknowledge message back to client, in some of these embodiments. This can happen as long as the client keeps sending data. A backend resource can read data from the network connection manager buffer and discard it after it is processed.

FIG. 6 shows how receive data is logically represented in the network connection manager domain, in some embodiments. In some embodiments, the network protocols, such as TCP, are stream-oriented protocols. These protocols provide an abstraction which allows transferring ordered sequence of bytes from one endpoint to another. In some embodiments, these protocols do not put limits on how long this sequence be, so it can be effectively infinite. In the network connection manager, the network connection receive stream, such as the TCP receive stream, can be represented as a logical dynamic byte array, where the first received byte has index 0, and second byte has index 1, and so on. This array will increase in its size while a client keeps sending more data to the network connection manager.

A backend resource can read data from the receive stream by calling API "ReadFromSocket" in some embodiments. In this API, the caller specifies a socket ID, an absolute offset and a length of data they want to read. "ReadFromSocket" can be a pure function, such that calling it does not affect data stored in the receive stream and does not produce any other side effects. A backend resource can call this API with the same input multiple time and will receive the same data from the receive stream.

There is practical limit on how much data can be stored in the receive buffer. This limit can be configurable by the customer, in some embodiments. If client sends more data than can be stored in the buffer, the network connection manager can stop accepting new packets and can use a rate control mechanism to inform client that there is no space in the receive buffer. Element 606 of FIG. 6 demonstrates that the client has sent more data such that the buffer is full. The backend resource can discard old already processed data from the receive stream to free space in the buffer and let client send more data by calling, for example, API "trim-SocketReceiveStream" in some embodiments. The backend resource can specify which data in the stream can be safely discarded. For example, in element 608 the backend resource trimmed the first 500K of the stream and so the buffer advances. In element 610, the Network Connection Manager received a total 3000K of data from client. The first 2500K of data was processed by the backend resource and discarded, leaving 500K remaining in the buffer. After data is discarded, it cannot be re-read again. A general receive workflow will look like the following:

1. Read data from Socket
2. Process data or persist data to the non-volatile storage
3. Make a checkpoint
4. Trim Socket Receive Stream
5. GoTo 1

An example of pseudocode which moves data from a socket to a bucket in the backend resource in 100K chunks is shown below. A Checkpointing step is not implemented in this pseudocode:

```
/* Chunk size is 100 KB */
var chunkSize=100 * 1024;
function processSocket (socketId, gadget) {
    var my Storage=new Storage( );
    /* i: chunk index */
    for (int i=0; ; i++) {
        /* absolute offset of chunk in the stream calculated
           from chunk index and chunk size */
        var absoluteOffset=i * chunkSize;
        /* chunk data from socket */
        var   receiveData=gadget.ReadFromSocket(socketId,
            absoluteOffset, chunkSize);
        /* Save chunk to my Storage */
        myStorage.putObject({
            Bucket: "my-bucket",
            Key: socketId+"-" +i,
            Body: receiveData
        });
        /* Checkpoint here */
        /* After we saved data to myStorage, it's safe to discard
           this data from Socket */ gadget.TrimSocketRe-
           ceiveStream(socketId, absoluteOffset+receiveData-
           .length);
        /* If ReadFromSocket returned less data than we
           requested, this means it is end of the stream */
        if (receiveData.length<chunkSize) {
            break;
        }
    }
}
```

Network connections are usually two-way, so therefore a backend resource can send data to a client over the network connection, such as TCP, as well. Each socket has an associated send stream. The backend resource can write data to the send stream, and it can be automatically transmitted to client over the network connection, such as TCP. The network connection manager 104 performs all necessary operations to re-transmit data and discard acknowledged data. The backend resource can send data through the socket by calling, for example, "SendToSocket." This function accepts an absolute offset as a parameter as well, which works as an idempotency token. The function also requires the data that is to be sent as an input parameter. The backend resource can call "SendToSocket" with the same absolute offset multiple times, and the data will be sent to client only once. Simplified pseudocode which, in some embodiments, copies data from one socket into another socket with chunks of 100K is below:

```
var chunkSize=100 * 1024;
/* Pipes data from Receive Stream of socketIn to Send
Stream of socketOut */
function pipeSockets(socketIn, socketOut, gadget)}
    var offset=0;
    while (true)}
        /* Read chunk from socketIn */
        var chunkData=gadget.ReadFromSocket(socketIn, off-
            set, chunkSize);
        /* Write chunk to socketOut */
        var sentLength=gadget. SendToSocket(socketOut, off-
            set, chunkData);
        /* Checkpoint here */
        /* Advance offset by number of bytes we were able to
           send */
        offset+=sentLength
        /* Trim socketIn */
        gadget.TrimSocketReceiveStream(socketId, offset);
    }
}
```

Other workflows which a network connection manager can support, in some embodiments, are end a network connection, establish an outgoing network connection, and provide a DNS resolution functionality. A backend resource can end a network connection. In some embodiments, there are two ways. A backend resource can finalize by calling a finalize function for the network connection, such as TCP FIN. However, the backend resource might keep waiting for data and a FIN from the client, in some embodiments. Else, a backend connection can reset which immediately discards the socket from the network connection manager and does not accept any more data. The network connection manager can also provide DNS resolution functionality, in some embodiments. This can be useful, for example, when a customer has attached a network interface from its partner from another network, so that private DNS records can be resolved.

Figure 7:
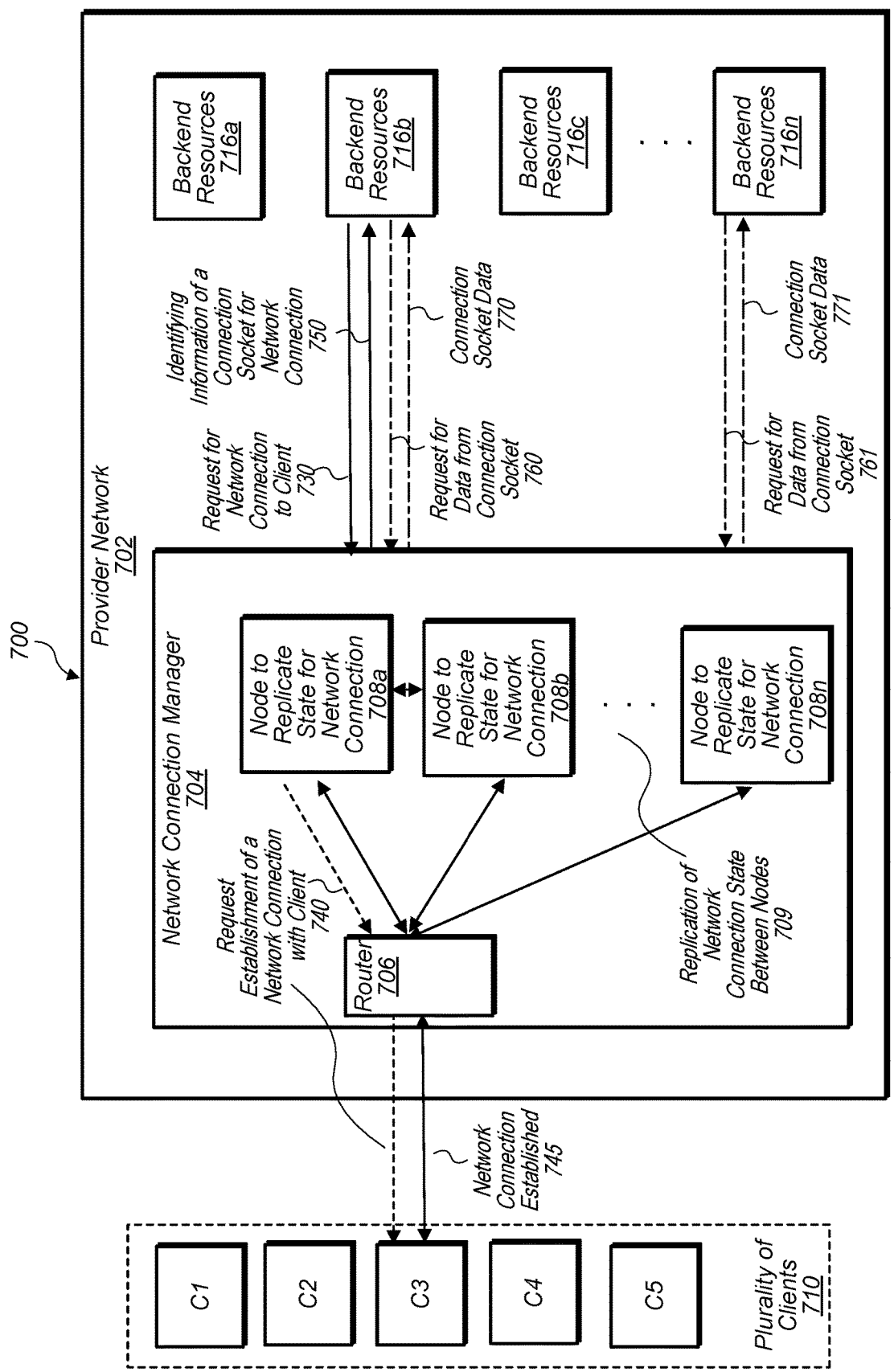
FIG. 7 illustrates a system that comprises a network connection manager, a plurality of clients, and a plurality of backend resources, where a backend resource establishes an outgoing connection through the network connection manager to the client, according to some embodiments.

The network connection manager allows not only accepting network connections, but also establishing network connections, such as acting like a TCP client for the TCP protocol. FIG. 7 illustrates a system that comprises a network connection manager, a plurality of clients, and a plurality of backend resources, where a backend resource establishes an outgoing connection through the network connection manager to the client, according to some embodiments. The outgoing connection can work the same way as incoming, in these embodiments, with the only difference that the backend resource needs to make a connect call to establish the connection, in some embodiments. The backend resource can first make a connection request to the network connection manager for a connection to a client 730. The backend resource might specify the specific client with which the connection is desired to be established, or the backend resource may not specify a specific client, in which case the network connection manager, or some other device, potentially at the client side, determines which client of the plurality of clients the connection will be established with.

The network connection manager would then initiate or request the establishment of a connection to a client 740. In the embodiments using TCP, for example, the network connection manager would act like the TCP client in these embodiments. For example, during the TCP initialization, in some embodiments, the network connection manager would send a SYN packet to a client. If the client receives a SYN packet on one of the ports it is listening to, then the client will send a response, such as a SYN-ACK packet, to the network connection manager, in some embodiments. In response to receiving a SYN-ACK packet, the network connection manager will send an ACK packet back to the client, in some embodiments. After a connection is then established with a client 745, the network connection manager will send identifying information of a connection socket for the network connection back to the requesting backend resource 750. The requesting backend resource might respond with an "AcknowledgeSocket" or some other communication mechanism to acknowledge that it has received the socket, in some embodiments.

After the backend resource receives this identifying information of a socket, then the communication between the client and backend resources would proceed as otherwise described in this specification. In summary, the backend resource 716b can start reading data from the socket by requesting data from the connection socket 760, in the embodiments shown in FIG. 7. The backend resource 716b can also send data to the client by sending data to the socket, as described previously. As one example, the backend resource 716b can perform a "ReadFromSocket" operation. The backend resource 716b can provide the socket ID and a data offset to the network connection manager 704 as part of the operation. The network connection manager 704, in response to this request, provides data from the connection socket to the backend resource 770. Therefore, whatever data a client C3 sends over network connection 745 to the network connection manager 704, the backend resource 716b can read from the socket in the embodiments shown in FIG. 1

FIG. 7 also discloses that the backend resource 716n can also start reading data from the socket by requesting data from the connection socket 761. The backend resource 716n can also send data to client by sending data to the socket, as described previously. As an example, the backend resource 716n can request the same or different data that was read from backend resource 716b. The network connection manager 704, in response to this request, provides data from the connection socket to this backend resource 745. The backend resource 716n somehow obtained the socket identification of the socket associated with network connection 745 in order to request data from the connection socket 761. Backend resource 716n might have been sent this information from another backend resource, for example, or might have been given the information by an application developer or by IT professional through system call managing the backend resources, as another example.

Data Plane API for a Network Connection Manager

FIG. 8 is a listing of some predefined data plane API commands of the network connection manager for use by a backend resource, including request parameters and response elements, according to some embodiments. These APIs can be used to manage network sessions, and to send and receive data, in these embodiments. In some embodiments, they are called on the network connection manager-specific endpoint, and they are executed in the context of the corresponding network connection manager.

AcceptSocket

"AcceptSocket" returns the first socket from the network connection manager accept queue, in some embodiments. After the socket is returned, it is temporarily marked as invisible and won't be returned to other callers to avoid multiple callers discover the same socket. Each listener has an independent accept queue associated with it. So AcceptSocket will return a socket from the queue of corresponding listener. If there are no sockets in the Accept Queue, this call will be blocked until new sockets appears in the queue. Element 810 of FIG. 8 shows that the request parameters and response parameters are the following:

---

Request parameters
   ListenerId: ListenerID
Response parameters
   Socket: Socket object metadata:
     {
       "SocketId": "socket-1234567",
       "LocalAddress": {
         "NetworkInterface": "eni-12345",
         "IpAddress": "10.0.4.5",
         "Port": "80"
       },
       "RemoteAddress": {
         "IpAddress" "1.2.3.4",
         "Port": "54321"
       }
     }

---

AcknowledgeSocket

"AcknowledgeSocket" marks a socket as "acknowledged" which removes it from the accept queue forever, in some embodiments. In some embodiments, a backend resource should call this API only after it has persisted information about the socket to a non-volatile storage, since there will be no way to re-discover socket information after it called AcknowledgeSocket. Element 820 of FIG. 8 shows that the request parameters and response parameters are the following:

Request parameters
  SocketId: SocketId to acknowledge
Response parameters
  None ReadFromSocket "ReadFromSocket" reads data from a socket receive stream, in some embodiments. A backend resource has to specify an absolute offset of data that it wants to read, where 0 is the first byte in the stream lifetime, and each following byte monotonically increases. This API does not have side effects and effectively is idempotent. This function can return a number of bytes which is equal to the length parameter if that many bytes is available. If an requested amount of bytes is not available, this function will block until the bytes are available. If network stream is ended, this function can return less bytes than specified in length and will not block. Element 830 of FIG. 8 shows that the request parameters and response parameters are the following:

Request parameters
  SocketId: socketId from which to read data
  AbsoluteOffset: absolute offset of requested data (0 is the first byte in the stream). It works as an effective idempotency token.
  Length: length of data to read
Response parameters
  Response is a binary blob which represents data TrimSocketReceiveStream "TrimSocketReceiveStream" discards already processed data from the socket receive stream, according to some embodiments. This API frees an internal network connection manager buffer for new data for client. However, it does not affect byte indexing in the receive stream, so, say 100$^{th}$ byte will become 100$^{th}$ byte even if previous 99 bytes were discarded. Element 840 of FIG. 8 shows that the request parameters and response parameters are the following:

Request parameters
  SocketId: Socket Id for which to discard data
  AbsoluteOffsetExclusive: Absolute offset of first non-discarded byte (everything before it will be discarded)
  Data
Response parameters
  None SendToSocket "SendToSocket" sends data to the stream socket, in some embodiments. The caller specifies data to send as well as absolute offset of that data in the send stream. The network connection manager will perform de-duplication of requests based on the absolute offset parameters, making sure that each byte is sent only once. If the send buffer associated with the socket does not have enough space to put the data, it will accept only that portion of data for which there is space in buffer. It returns number of actually accepted bytes. Element 850 of FIG. 8 shows that the request parameters and response parameters are the following:

Request parameters
  SocketId: Socket ID to which send the data
  AbsoluteOffset: Absolute offset of the sent data in the send stream
  Data: binary blob with data to send
Response parameter
  Length: Number of bytes which was sent. It can be less than size of Data if Send Buffer does not have enough capacity to hold all data provided.

A Network Connection Manager in a Provider Network

This section describes example provider network environments in which embodiments of a network connection manager may be implemented. However, these example provider network environments are not intended to be limiting.

Figure 9:
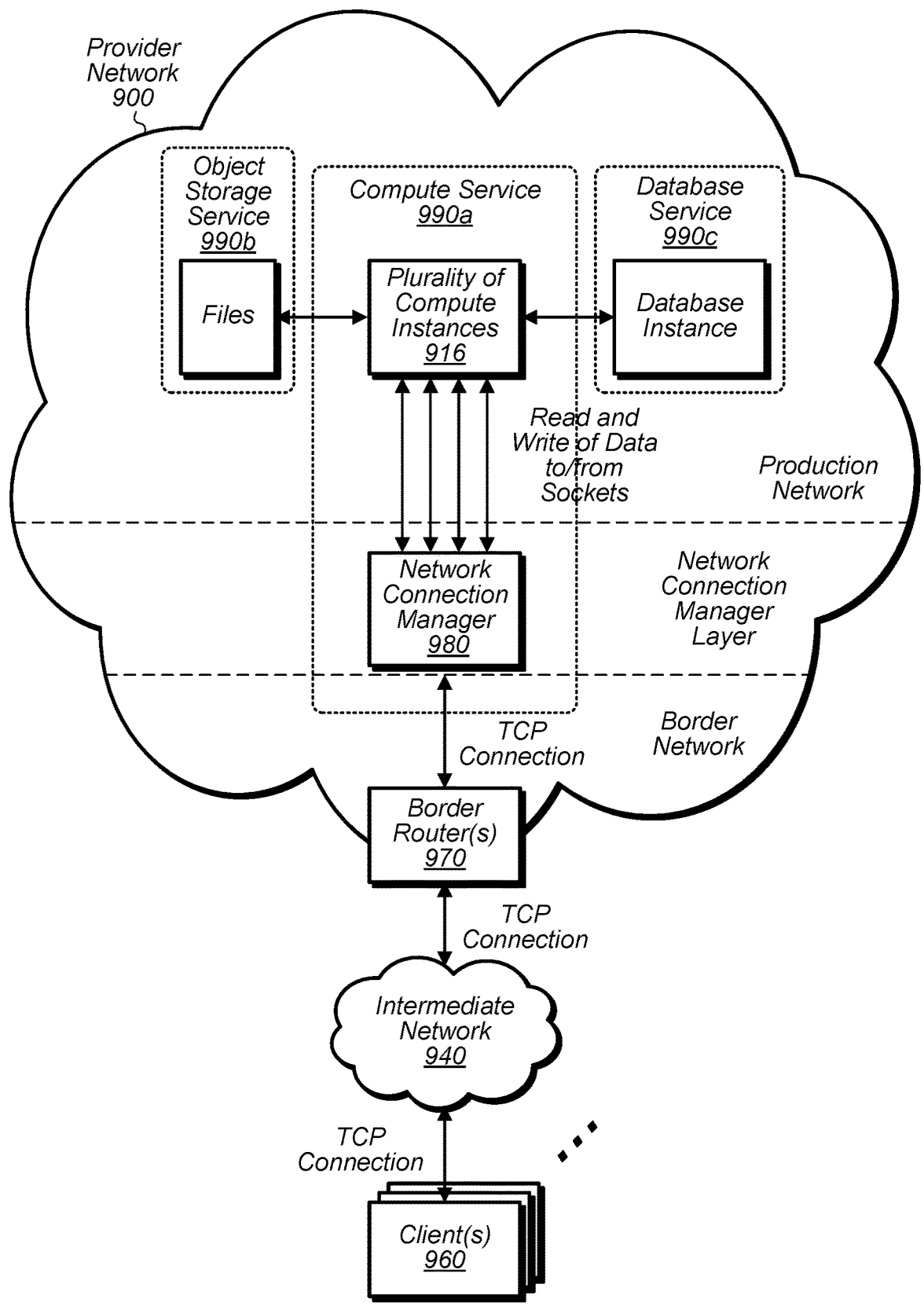
FIG. 9 illustrates a network connection manager in an example provider network environment, according to at least some embodiments.

FIG. 9 illustrates a network connection manager and a router service in an example provider network environment, according to at least some embodiments. A provider network 900 may provide resource virtualization to clients via one or more virtualization services that allow clients to access, purchase, rent, or otherwise obtain instances of virtualized resources, including but not limited to computation and storage resources, implemented on devices within the provider network or networks in one or more data centers. In some embodiments, private IP addresses may be associated with the resource instances; the private IP addresses are the internal network addresses of the resource instances on the provider network 900. In some embodiments, the provider network 900 may also provide public IP addresses and/or public IP address ranges (e.g., Internet Protocol version 4 (IPv4) or Internet Protocol version 6 (IPv6) addresses) that clients may obtain from the provider 900.

Conventionally, the provider network 900, via the virtualization services, may allow a client of the service provider (e.g., a client that operates clients 960) to dynamically associate at least some public IP addresses assigned or allocated to the client with particular resource instances assigned to the client. The provider network 900 may also allow the client to remap a public IP address, previously mapped to one virtualized computing resource instance allocated to the client, to another virtualized computing resource instance that is also allocated to the client. Using the virtualized computing resource instances and public IP addresses provided by the service provider, a client of the service provider such as the operator of clients 960 may, for example, implement client-specific applications and present the client's applications on an intermediate network 940, such as the Internet. Either the clients 960 or other network entities on the intermediate network 940 may then generate traffic to a destination domain name published by the clients 960. First, either the clients 960 or the other network entities make a request to the network connection manager 980 for a connection to a compute instance in the plurality of compute instances 916.

The network connection manager 980 responds with the identifying information which might include a public IP address of itself Then the clients 960 or other network entities on the intermediate network 940 may then generate traffic to public IP address that was received by the router service. The traffic is routed to the service provider data center, and at the data center is routed, via a network substrate, to the private IP address of the network connection manager currently mapped to the destination public IP address. Similarly, response traffic from the network connection manager may be routed via the network substrate back onto the intermediate network 940 to the source entity.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance. Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

A provider network 900 may provide a compute service 990a implemented by physical server nodes to clients 960, which includes a plurality of compute instances 916. The compute service also contains many other server instances for many other clients and other customers of the provider network 900. As another example, the provider network provides a virtualized data storage service or object storage service 990b which can include a plurality of data storage instances implemented by physical data storage nodes. The data storage service or object storage service 990b can store files for the client, which are accessed by the appropriate server instance of the client. As another example, the provider network might provide a virtualized database service 990c implemented by database nodes, which includes at least one database instance for a client. A server instance pertaining to the client in the compute service can access a database instance pertaining to the client when needed. The database service and data storage service also contain multiple files or database instances that pertain to other clients and other customers of the provider network 900. The provider network can also include multiple other client services that pertain to one or more customers. The clients 960 may access any one of the client services 990a, 990b, or 990c, for example, via an interface, such as one or more APIs to the service, to obtain usage of resources (e.g., data storage instances, or files, or database instances, or server instances) implemented on multiple nodes for the service in a production network portion of the provider network 900.

Communication from the clients to an instance of a service can be routed to the appropriate instance by a border router 970 and a network connection manager 980. Server nodes in the compute service 990a may each implement a server, for example a web server or application server or a cloud-based browser. One or more network connection managers 980 may be implemented in a network connection manager layer between the border network and the production network. Border router(s) 970 may receive packets (e.g., TCP packets) in packet flows from clients 960 via an intermediate network 940 such as the Internet, and forward the packets to the appropriate server node or instance, or it might forward the packets containing a public IP address to an apparatus that can map the public IP address to a private IP address. The packets may be targeted at the public IP address(es) included in responses to requests. The network connection managers 980 may use the procedures described herein to determine target server nodes or compute instances in the plurality of compute instances 916 for the packet flows, and to facilitate traffic between the compute instances and the clients 960.

Illustrative System

Figure 10:
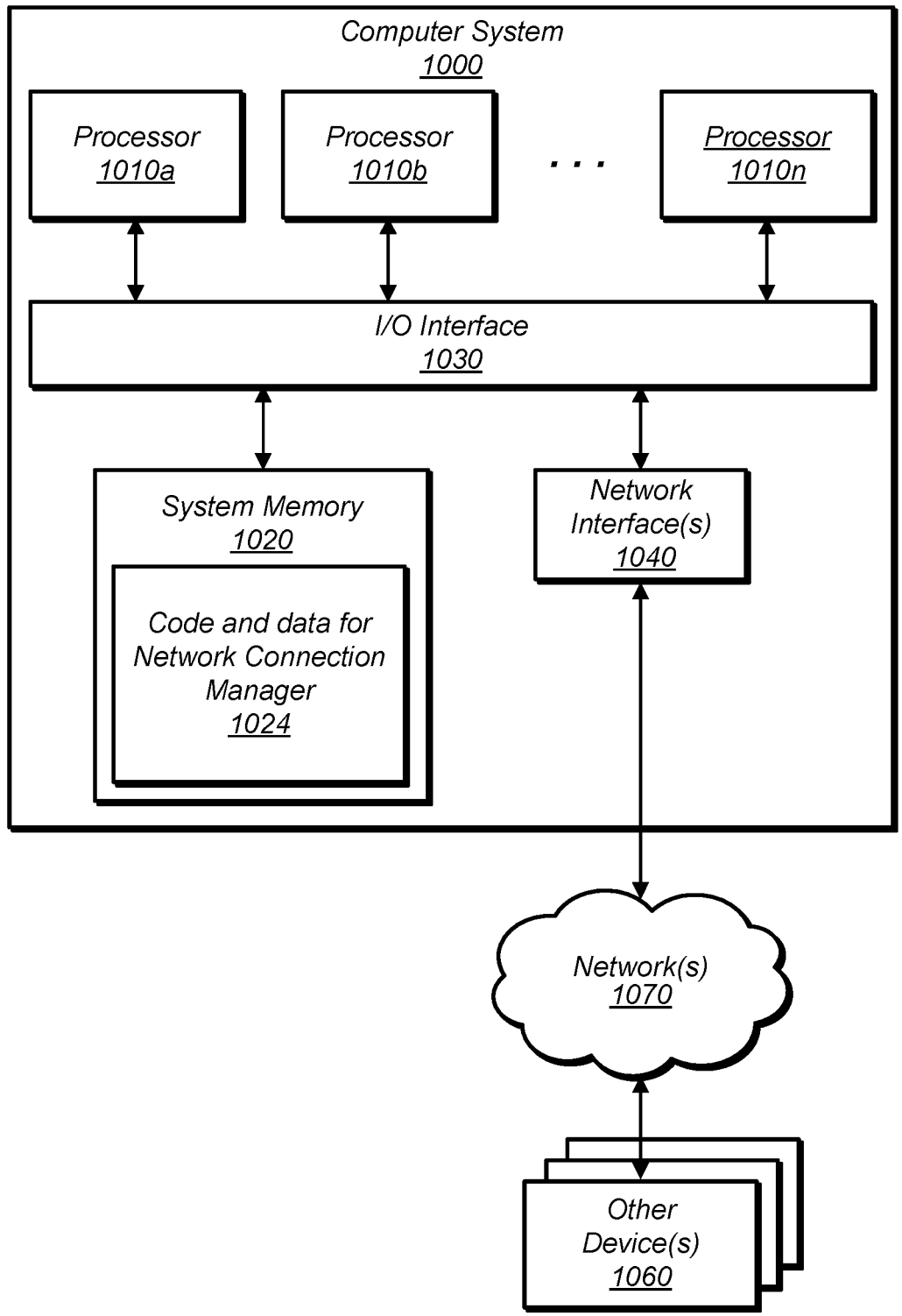
FIG. 10 is a block diagram illustrating an example computer system that may be used in some embodiments.

In at least some embodiments, a computer that implements a portion or all of a network connection and termination system, as described herein, may include a general-purpose computer system or computing device that includes or is configured to access one or more computer-accessible media, such as computer system 1000 illustrated in FIG. 10. FIG. 10 is a block diagram illustrating an example computer system that may be used in some embodiments. This computer system can be used as a network connection manager 104, for example, or as a backend resource host which executes one or more of backend resource instances (such as 116) or one or more of the plurality of compute instances 916 in the compute service 990a. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for a network connection and termination system, are shown stored within system memory 1020 as the code and data for a network connection manager 1024.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1070, such as other computer systems or devices as illustrated in FIGS. 1, 2, 4, and 5, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing a network connection manager. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

In the previous sections, reference has been made in detail to embodiments, examples of which have been illustrated in the accompanying drawings. In the previous detailed description, numerous specific details have been set forth in order to provide a thorough understanding of the present disclosure. However, it should be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may have been described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term has been used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may have been used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a plurality of computing devices of a provider network, the plurality of computing devices comprising respective hardware processors and memory, wherein the plurality of computing devices comprises:
      a plurality of computing devices configured to implement the plurality of backend resources; and
      one or more computing devices configured to implement a network connection manager comprising a plurality of nodes to manage network connections for the plurality of backend resources, wherein the network connection manager is configured to:
         establish a network connection with a client of a plurality of clients, wherein the establishment of the network connection is initiated by either the client or the network connection manager, wherein at least one of the plurality of nodes is an endpoint of the network connection with the client;
         distribute state information of the network connection to at least one other of the plurality of nodes, such that at least two nodes track the state of the network connection;
         receive data from the client via the network connection;
         receive a request from a first backend resource of the plurality of backend resources for identifying information of a network connection with a client;
         provide identifying information of a socket associated with the network connection with the client to the first backend resource;
         receive a request from a second backend resource of the plurality of backend resources for data from the socket; and
         provide at least a portion of the data, or an indication of at least a portion of the data, associated with the socket to the second backend resource.

2. The system of claim 1, wherein the network connection manager is further configured to:
   in response to a failure of one of the at least two nodes that track the state of the network connection, use one or more of the remaining nodes of the at least two nodes to maintain the network connection with the client.

3. The system of claim 1, wherein individual ones of the plurality of backend resources are configured to:
   request identifying information of a network connection with a client from the network connection manager;
   receive identifying information of a socket from the network connection manager;
   request to read data associated with the socket from the network connection manager; and
   receive at least a portion of the data, or an indication of at least a portion of the data, associated with the socket from the network connection manager.

4. The system of claim 1, wherein the first backend resource is configured to provide the identifying information of the socket associated with the network connection with the client to the second backend resource, prior to the network connection manager receiving the request from the second backend resource for the data from the socket.

5. The system if claim 1, wherein the network connection manager is further configured to:
   receive a request from the second backend resource of the plurality of backend resources to send data to the socket; and
   send the data received from the second backend resource to the client via the network connection.

6. A method, comprising:
   establishing, by a network connection manager, a network connection with a client at a first node of a plurality of nodes of the network connection manager;
   distributing the state of the network connection to at least a second node of the plurality of nodes, such that at least two of the plurality of nodes track the state of the network connection;
   providing identifying information of a socket associated with the network connection with the client to a first backend resource;
   receiving a request from a second backend resource for data from the socket; and
   providing at least a portion of the data, or an indication of at least a portion of the data, associated with the socket to the second backend resource.

7. The method as recited in claim 6, further comprising detecting a failure of the first node or the second node; and maintaining the network connection with the client using a remaining node of the at least two of the plurality of nodes of the network connection manager.

8. The method as recited in claim 6, wherein prior to receiving a request from the second backend resource for the data from the socket, the method further comprises:
providing, by the first backend resource, the identifying information of the socket to the second backend resource.

9. The method as recited in claim 6, further comprising:
sending data received from the second backend resource to the client via the network connection.

10. The method as recited in claim 6, further comprising:
establishing a plurality of network connections with at least the client, wherein the network connection manager comprises a data structure for storing identifying information of sockets associated with the plurality of network connections, and
wherein providing identifying information of the socket associated with the network connection with the client to the first backend resource further comprises:
providing the identifying information using the information in the data structure.

11. The method as recited in claim 6, further comprising:
receiving a request from a requesting backend resource to establish a new network connection with a client;
establishing, by the network connection manager, a new network connection with a client; and
providing identifying information of a socket associated with the new network connection with the client to the requesting backend resource.

12. The method as recited in claim 6, wherein the method further comprises:
receiving data from the client via the network connection;
receiving a request from the first backend resource to read data associated with the socket; and
providing at least a portion of the data, or an indication of at least a portion of the data, associated with the socket to the first backend resource.

13. The method as recited in claim 12, further comprising:
deleting, in response to a request, from either the first or second backend resource, to delete at least a portion of the data associated with the socket from a data storage associated with the socket, the at least portion of the data from the data storage associated with the socket.

14. One or more non-transitory computer-readable storage media storing program instructions that when executed on or across one or more processors of a network connection manager cause the one or more processors to:
establish a network connection with a client at a node of the network connection manager;
provide identifying information of a socket associated with the network connection with the client to a first backend resource; and
receive a request from the first backend resource for data from the socket;
provide at least a portion of the data, or an indication of at least a portion of the data, associated with the socket to the first backend resource;
receive a request from a second backend resource for data from the socket; and
provide at least a portion of the data, or an indication of at least a portion of the data, associated with the socket to the second backend resource.

15. The one or more non-transitory computer-readable storage media of claim 14, wherein the program instructions cause the network connection manager to further perform:

distribute the state of the network connection to at least a second node of a plurality of nodes of the network connection manager, such that at least two of the plurality of nodes track the state of the network connection;
detect a failure of the node or the second node; and
maintain the network connection with the client using the remaining nodes of the at least two of the plurality of nodes of the network connection manager.

16. The one or more non-transitory computer-readable storage media of claim 14, wherein the program instructions cause the network connection manager to further perform:
establish a plurality of network connections with at least the client, wherein the network connection manager comprises a data structure for storing identifying information of sockets associated with the plurality of network connections, and
wherein to provide the identifying information of the socket associated with the network connection with the client to the first backend resource, the program instructions cause the network connection manager to further perform:
provide the identifying information using the information in the data structure.

17. The one or more non-transitory computer-readable storage media of claim 14, wherein the program instructions cause the network connection manager to further perform:
send data received from the second backend resource to the client via the network connection.

18. The one or more non-transitory computer-readable storage media of claim 14, wherein the program instructions cause the network connection manager to further perform:
receive a request from a requesting backend resource to establish a new network connection with a client;
establish a new network connection with a client; and
provide identifying information of a socket associated with the new network connection with the client to the requesting backend resource.

19. The one or more non-transitory computer-readable storage media of claim 14, wherein prior to providing the identifying information of the socket associated with the network connection with the client to a first backend resource, the program instructions cause the network connection manager to further perform:
receive a request for identifying information of a network connection with a client from the first backend resource; and
wherein, prior to providing at least a portion of the data, or an indication of at least a portion of the data, associated with the socket to the first backend resource, the program instructions cause the network connection manager to further perform:
receive data from the client via the network connection.

20. The one or more non-transitory computer-readable storage media of claim 19, wherein the program instructions cause the network connection manager to further perform:
receiving a request, from either the first or second backend resource, to delete at least a portion of the data associated with the socket from a data storage associated with the socket; and
deleting the at least portion of the data from the data storage associated with the socket, such that the at least portion of the data cannot be read again by another backend resource.

* * * * *